United States Patent
Anderson et al.

[15] 3,696,258
[45] Oct. 3, 1972

[54] ELECTRET MOTORS CAPABLE OF CONTINUOUS ROTATION

[72] Inventors: Wilmer C. Anderson, Greenwich; Robert W. Windebank, Fairfield, both of Conn.

[73] Assignee: General Time Corporation, Phoenix, Ariz.

[22] Filed: July 30, 1970

[21] Appl. No.: 59,513

[52] U.S. Cl.................................310/5, 310/10
[51] Int. Cl.........................................H02n 1/00
[58] Field of Search...........310/2, 5, 6, 46; 324/109

[56] References Cited

UNITED STATES PATENTS

| 2,232,143 | 2/1941 | Schweitzer | 324/109 X |
| 2,993,159 | 7/1961 | Devol | 310/46 X |

OTHER PUBLICATIONS

Publication, Electrets & Related Phenomena Edited by Baxt et al, 1968, Elec.-Chem. Soc., N.Y.C., pp. 100,101

Publication, Electrety; A. H. Gubin, Moscow 1961 QC585.68, pp. 130,131.

Publication, Electrety; Myazdrikof & Manoilof; Moscow 1962 QC585,M57 pp. 80–83.

Use of Electrets in Electrical Instruments by Andrew Gemant, Rev. of Scientific Instruments, Vol. 11, 1940, pages 65–71.

*Primary Examiner*—D. X. Sliney
*Attorney*—Pennie, Edmonds, Morton, Taylor & Adams

[57] ABSTRACT

An electric motor comprises a rotor including a plurality of electret portions and a stator including an array of fixed electrode pairs for driving the electret rotor in response to an applied AC voltage. A significant advantage of this motor is the fact that it does not require either wound conductive coils or a laminated metal core; consequently, it can be more easily fabricated than typical prior art motors. In a preferred embodiment, the rotor comprises a rotatably mounted circular disc including a plurality of electret portions disposed at equal angular intervals around the rotor disc. The stator can comprise a pair of fixed discs, having a plurality of opposing electrode portions.

12 Claims, 14 Drawing Figures

PATENTED OCT 3 1972

INVENTORS
ROBERT W. WINDEBANK
WILMER C. ANDERSON

BY *Rennie, Edmonds, Morton, Taylor & Adams*

ATTORNEYS

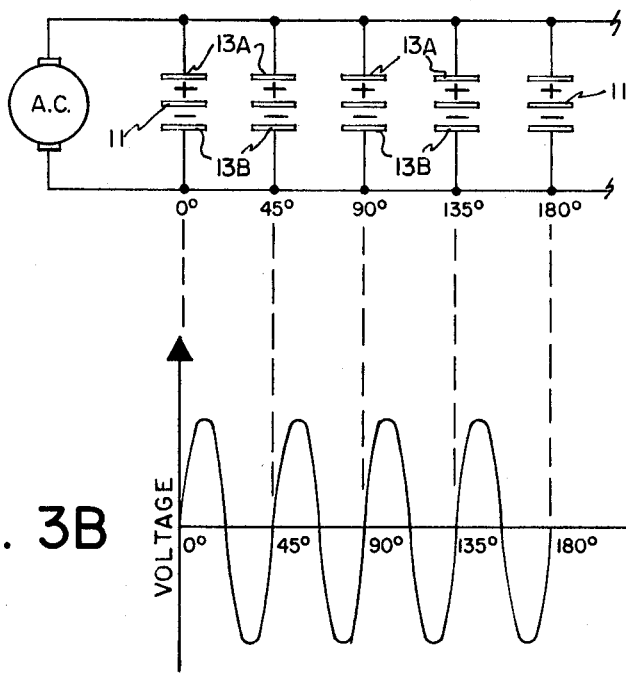
FIG. 3A
FIG. 3B
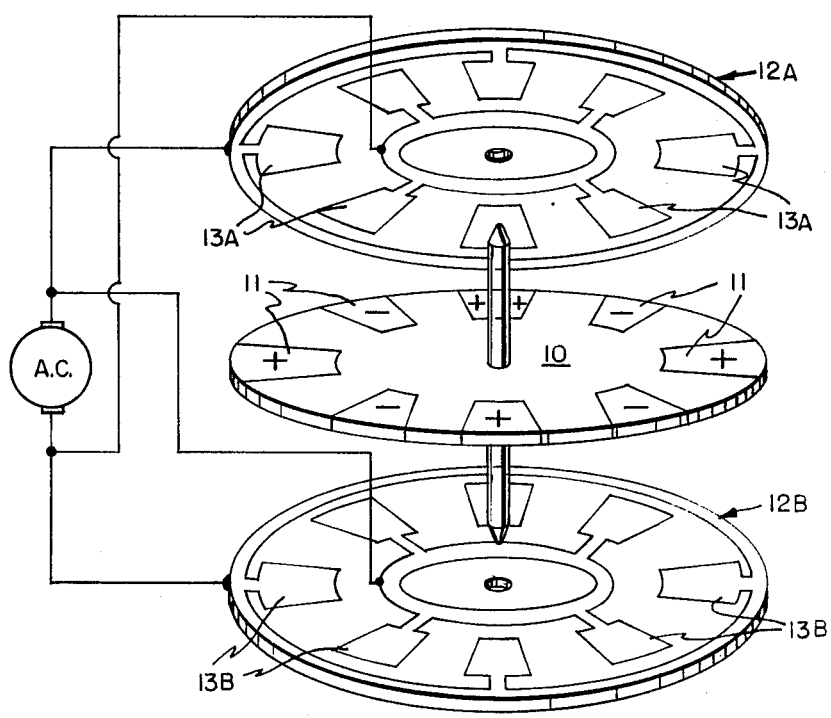
FIG. 4
INVENTORS
ROBERT W. WINDEBANK
WILMER C. ANDERSON

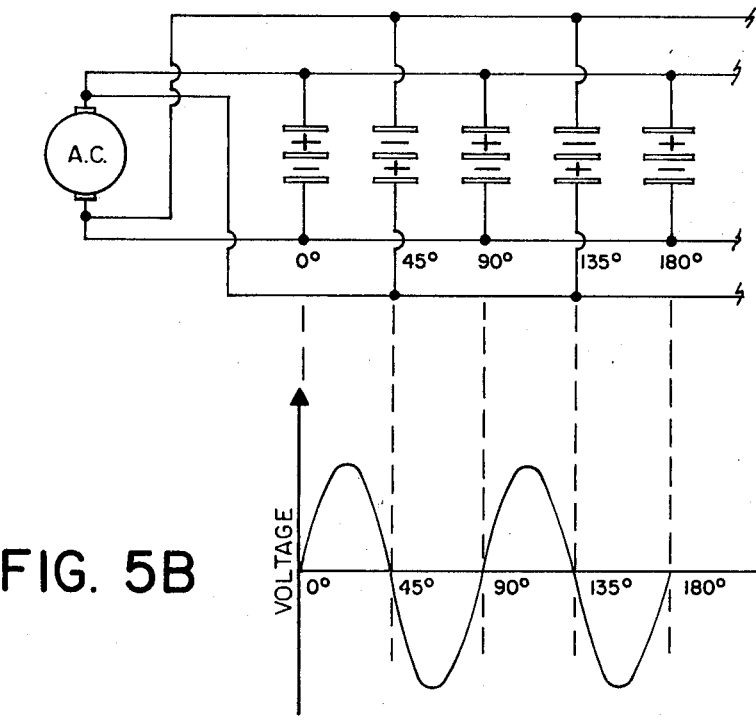
FIG. 5A
FIG. 5B
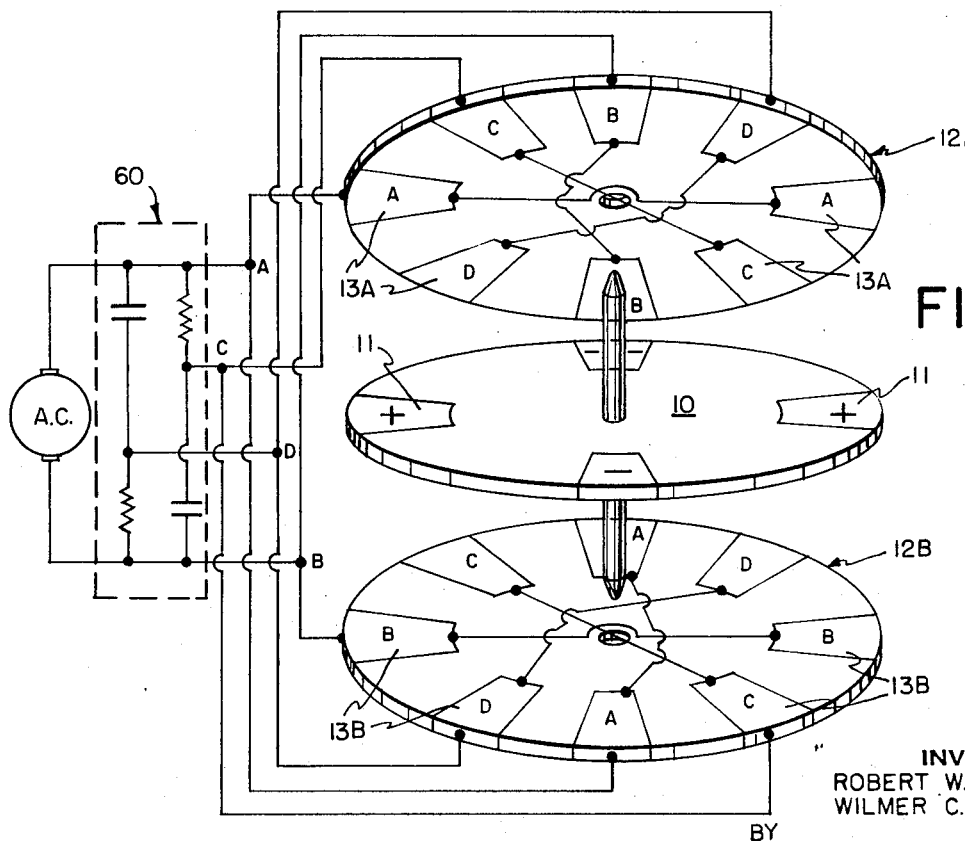
FIG. 6

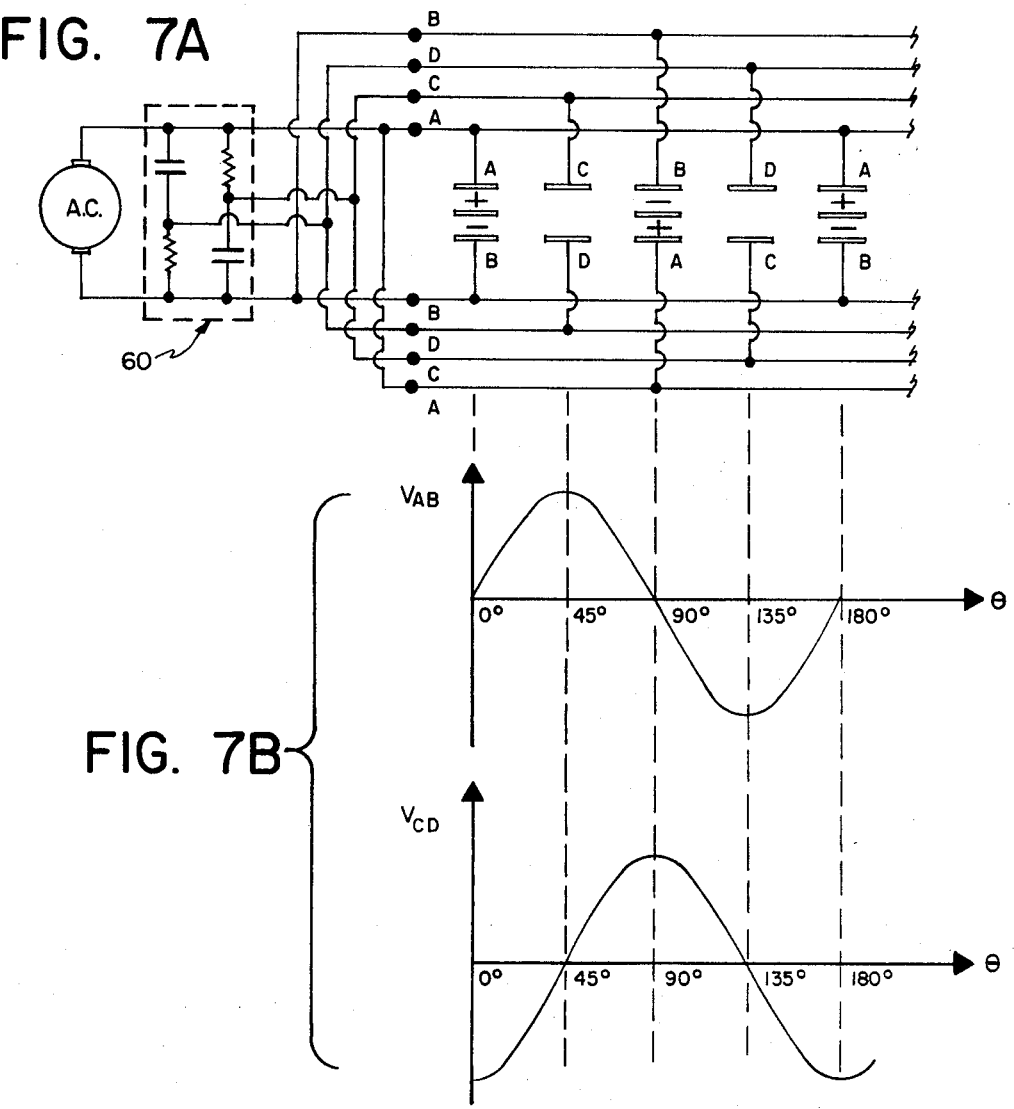
FIG. 7A
FIG. 7B
FIG. 8
INVENTORS
ROBERT W. WINDEBANK
WILMER C. ANDERSON
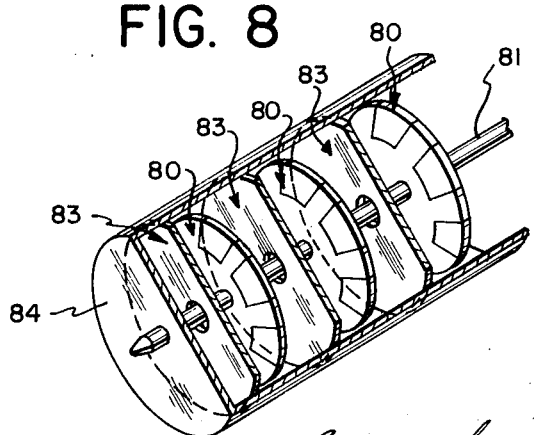
ATTORNEYS

ELECTRET MOTORS CAPABLE OF CONTINUOUS ROTATION

BACKGROUND OF THE INVENTION

The present invention relates to an electret electrical motor capable of continuous rotation.

Electrical motors are among the most important and best known means for converting electrical energy—either DC or AC—into useful mechanical energy. These motors typically utilize the interaction between magnetic fields in a fixed member (stator) and a rotatably mounted member (rotor) to drive a shaft. The magnetic fields are produced by current carrying conductive coils wound into slots in the stator and rotor. At least one of the members, i.e., either the stator or rotor, is provided with means for applying electrical power to its coils. Current is applied to the coils of the other member either directly by connection with an electrical power source or indirectly by magnetic induction.

These motors, however, are relatively expensive and difficult to fabricate. The coils generally comprise lengthy portions of insulated wire—typically enameled copper—wound within the recesses of the supporting members, and the supporting members are usually built of thin insulated laminations of silicon steel (from about 0.025 to 0.014 inch thick) having uniformly distributed punched slots to receive the coil windings. It is clear that this structure presents relatively complex fabrication problems, such as the winding of the coils in the stator and rotor members, and requires numerous repetitive operations, such as the stamping out of the numerous steel plates required for a single member.

SUMMARY OF The INVENTION

In accordance with the present invention, an electric motor comprises a rotor including a plurality of electret portions and a stator including an array of fixed electrode pairs for driving the electret rotor in response to an applied AC voltage. A significant advantage of this motor is the fact that it does not require either wound conductive coils or a laminated metal core; consequently, it can be more easily fabricated than typical prior art motors. In a preferred embodiment, the rotor comprises a rotatably mounted circular disc including a plurality of electret portions disposed at equal angular intervals around the rotor disc. The stator can comprise a pair of fixed discs having a plurality of opposing electrode portions.

BRIEF DESCRIPTION OF THE DRAWINGS

The nature, features and advantages of the invention will appear more fully upon consideration of the various illustrative embodiments now to be described in detail in connection with the accompanying drawings.

In the drawings:

FIGS. 1, 4, and 6 are exploded partially schematic perspective views showing illustrative embodiments of electrical motors in accordance with the invention;

FIGS. 3A, 5A, and 7A are schematic circuit diagrams of the motors shown in FIGS. 1, 4, and 6, respectively;

FIGS. 3B, 5B, and 7B are graphical illustrations showing the applied voltage as a function of the angular position of a given electret pole when the motors of FIGS. 1, 4, and 6, respectively, are in operation; and FIG. 8 is a breakaway view showing a motor in accordance with the invention adapted to utilize a plurality of rotor discs to drive a common shaft.

In reference to the drawings, FIG. 1 shows an electret motor comprising a rotor disc 10 including one or more electret poles 11 uniformly distributed around the periphery of the disc. The stator comprises a pair of dielectric plates 12A and 12B having one or more pairs of electrodes, 13A and 13B, on respective discs for driving the rotor in response to an applied AC voltage. The rotor 10 is rotatably mounted between stator discs 12A and 12B on a shaft 14 which can pass through the stator to drive a motion converting mechanism, such as gear 15, which can be used, for example, as the drive gear of a clock train. Low friction bearings (not shown) are positioned at each end of the shaft. Preferably, the shaft maintains the rotor axially spaced from each of the electrodes 13A and 13B by an equal distance, $d$, so that the axial forces cancel one another.

As is well known in the art, electrets are dielectric materials in which a permanent state of electrostatic polarization has been established by the displacement of the positive charges in constituent atoms with reference to negative charges. They are typically produced by subjecting a plastic dielectric material, such as Mylar, to heat, applying a high electric field across the heated plastic and permitting the material to cool while the field is applied. The properties of and the methods for fabricating electrets are explained in detail in the literature of the art. See, for example, U.S. Pat. No. 3,118,022 issued to G. M. Dessler on Jan. 14, 1964. Electrets for the instant application can be of any dielectric which can be electrostatically polarized to a sufficiently high voltage—typically at least 400 volts—to be useful in motors. Mylar, polycarbonate, and polytetrafluorethylene are typical examples of such materials.

Figure 2A:
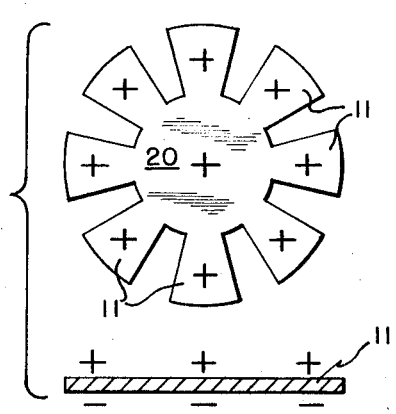
FIGS. 2A, 2B, 2C and 2D are views, in partial cross section, showing representative examples of rotors useful in electret motors.
Figure 2B:
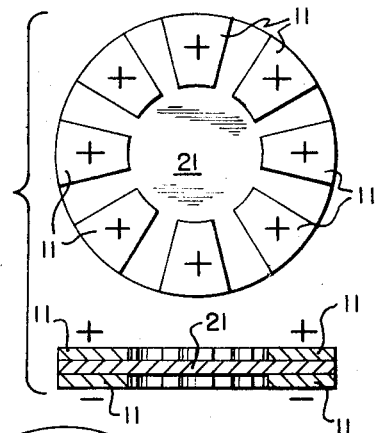
Figure 2C:
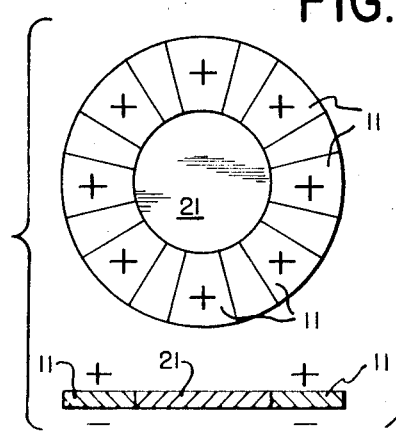
Figure 2D:
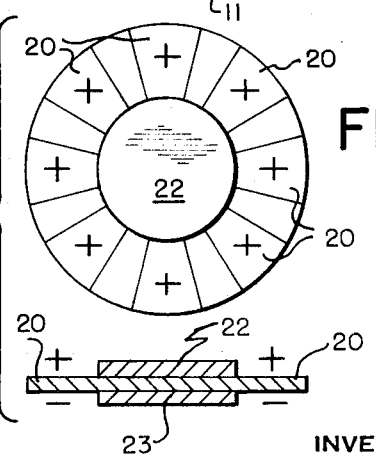

Rotor 10 is preferably a circular disc having a plurality of electrets attached at equal angular intervals around the circumference. It can conveniently comprise any one of a wide variety of structures. FIGS. 2A, 2B, 2C, and 2D show four representative examples. FIG. 2A illustrates a rotor comprising a single circular electret 20 in which sectors between adjacent electret poles 11 have been punched out or otherwise removed. FIG. 2B shows a rotor comprising a circular dielectric disc 21 to which pairs of oppositely oriented electrets have been attached on opposite sides at each electret pole. The resulting composite structures behave very much like single electrets. FIG. 2C shows a rotor comprising a dielectric disc in which sectors of electret material have been substituted for corresponding punched out sectors of dielectric. And FIG. 2D illustrates a rotor comprising a circular electret disc having dielectric layers 22 and 23 covering all but the desired electret poles 20. In some embodiments of the invention, it is useful to alternate the polarity of successive electret poles. This can be readily accomplished in the rotors of FIGS. 2B and 2C by simply turning alternate electrets upside down. While the above illustrations show only eight-pole rotors, they have been made with four, eight, and 16 poles. In general, in order to obtain a desired speed, the rotor can have any other number of poles (even or odd) which is practical.

The stator comprises a pair of dielectric plates having a plurality of electrode pairs for driving the rotor in response to an applied AC voltage. In the illustrative embodiment of FIG. 1, eight opposing electrode pairs are used in conjunction with eight electret poles. In general, there are usually at least as many electrode pairs as electret poles so that each pole is driven by at least one such pair. In multiphase motors, it is often desirable to utilize a number of electrode pairs which is an integral multiple of the number of electret poles.

The stator plates may be conveniently fabricated by well known printed circuit techniques. For example, the stators can comprise epoxy printed circuit boards having electrodes of the same general configuration as the electret poles uniformly distributed around the circumference of a congruent circle. The electrodes can be fabricated with appropriate electrical interconnections.

Advantageously, the stator plates are bound by a member (not shown), such as an axially extending cylinder, to form a hermetic seal around the rotor. This seal prevents variations in humidity from altering the output torque of the motor.

Figure 1:
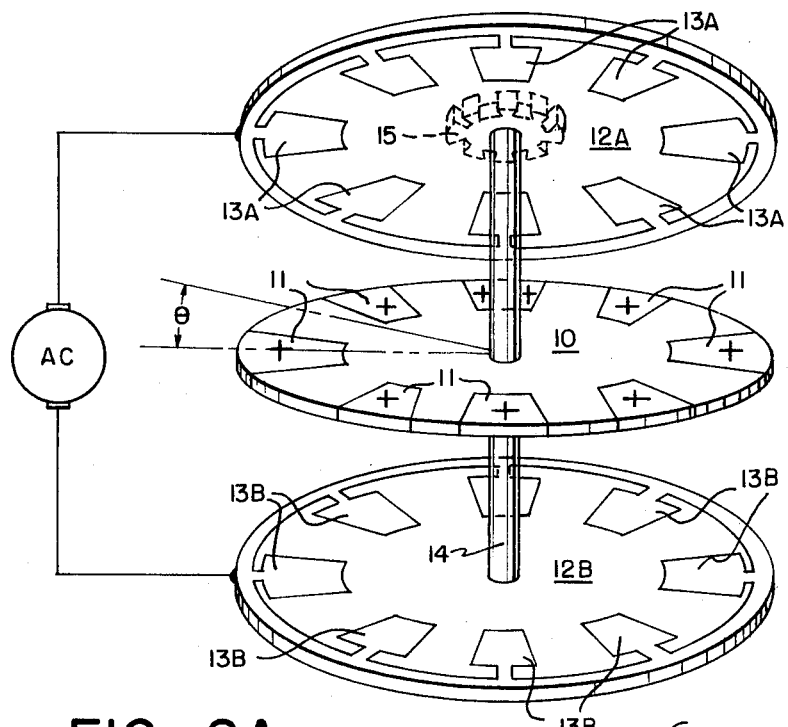

The operation of the motor can be more easily understood by reference to FIGS. 3A and 3B which show a schematic circuit diagram of the motor of FIG. 1 and a plot of an applied AC voltage as function of the angular position B of a moving rotor. As may be seen from the drawing, the AC voltage tends to drive the rotor at such an angular velocity that N cycles, where N is the number of electret poles, drive the rotor through 360°. Ideally, the AC voltage drives the rotor at such a velocity that the midpoint of the electret poles tends to pass the midpoints of the electrodes as the AC voltage wave passes through one of its zero voltage points, and begins to grow positive. At this point in time, both the upper and lower electrodes repel the rotor, driving it in the same direction in which it was moving. The rotor poles approach the midpoint between adjacent electrode pairs as the wave again changes polarity and is subsequently attracted toward the next successive electrode pair. The motor will behave in substantially the same manner if the AC voltage has a DC component.

It will be noted that the motor can be driven in either direction. A direction preference, however, can be easily established by displacing one of the rotor poles slightly in the direction of the desired motion.

As a specific example, an electret motor utilizing eight electret poles having a built-in field of 2,000 volts and disposed 1.5 centimeters from the rotor center is typical. If this motor is driven by a 100 volt AC drive (e.g., at 60 c.p.s.), the output torque is on the order of 385 gram-millimeters—an amount sufficient to drive a typical clock train or various indicating devices.

FIG. 4 shows an electret motor in accordance with the second embodiment of the invention. It differs from the motor shown in FIG. 1 chiefly in that it utilizes successive electrode pairs of opposite polarity in conjunction with successive electret poles of opposite polarity. The advantage of this type of motor is that each electret pole, in addition to being repelled by the electrode pair it has just passed, is also attracted by the next succeeding pair. Thus, the output torque approaches twice the corresponding value in the previously described motor.

The operation of this motor can be more easily understood by reference to FIGS. 5A and 5B which show, respectively, a schematic circuit diagram of the motor and a plot of applied AC voltage as a function of the rotor angle. It may be noted from the drawings that the applied voltage drives the rotor at such an angular velocity that N/2 cycles drive the rotor through 360°. More specifically, as in the previous motor, the applied voltage tends to drive the rotor at such a velocity that the electret poles tend to pass the electrode midpoints as the AC voltage wave passes through zero voltage points. Unlike the previous motor, however, the rotor poles approach the midpoint between adjacent electrode pairs as the wave approaches a maximum (or a minimum) value.

FIG. 6 shows a third embodiment of the invention comprising an electret motor adapted for a two-phase AC drive voltage. This motor differs from the one shown in FIG. 4 chiefly in that it includes two electrode pairs for each electret pole. AC voltages having a 90° phase difference for driving successive electrode pairs are conveniently provided by an AC supply connected to a phase shifter 60 such as the well-known resistance-capacitance 90° phase shifter shown. In addition, successive electrode pairs of the same phase are of opposite polarity. The operation of this motor may be seen by reference to FIGS. 7A and 7B which schematically illustrate the motor circuitry, including a phase shifter, and the drive voltage as a function of the rotor angle. The voltages tend to drive the rotor so that the pole centers pass the midpoints of each pair of electrodes just as the applied voltage reverses polarity. As in the case of the motor of FIG. 4, the voltage applied to successive electrode pairs of the same phase is at a maximum or a minimum when the pole is midway between them.

FIG. 8 shows yet a fourth embodiment of the invention for use in applications requiring greater torque than can be obtained from a single rotor. It comprises a plurality of electret rotors 80 disposed on a common shaft 81. The rotors are sandwiched between a plurality of stator members 83 each of which includes one or more electrodes (not shown) aligned to form a plurality of electrode pairs for driving the rotors. The stators are conveniently attached to a housing 84 with electrodes insulated therefrom. In this arrangement, the shaft 81 can thus be driven by a relatively large number of rotors each contributing to the total output torque.

I claim:

1. An electric motor capable of continuous rotation comprising, a rotor mechanically coupled to a rotatable shaft, said rotor comprising a disc having a plurality of electret poles uniformly distributed around the circumference in a circular pattern, and a stator including a pair of plates positioned on each side of said rotor and being coaxially aligned therewith, each plate having a plurality of electrodes uniformly distributed about the circumference thereof in a circular pattern.

2. A motor according to claim 1 wherein the circular patterns of said electret poles and said electrodes are of substantially the same radius.

3. A motor according to claim 2 wherein the electrodes of the stator plates are opposite one another to form electrode pairs.

4. A motor according to claim 3 wherein said rotor is rotatably mounted between said stator plates at a position substantially equidistant between them.

5. A motor according to claim 4 wherein there are at least as many electrode pairs as electret poles.

6. A motor according to claim 5 wherein the number of electrode pairs equals the number of electret poles.

7. A motor according to claim 6 wherein successive electret poles have the same polarity.

8. A motor according to claim 6 wherein;

successive electret poles have inverted polarities; and means are provided for inverting the polarity of the AC voltage applied to successive electrode pairs.

9. A motor according to claim 1 adapted to operate in response to a multiphase AC voltage.

10. A motor according to claim 9 wherein the number of electrode pairs is an integral multiple of the number of electret poles.

11. A motor according to claim 10 wherein;

the number of electrode pairs is twice the number of electret poles;

successive electret poles are of inverted polarity; and means are provided for applying to successive electrode pairs, AC signals having a 90° phase difference, and for inverting the polarity of successive electrodes receiving AC signals of the same phase.

12. An electric motor capable of continuous rotation comprising:

a plurality of rotors coupled to a common rotatable shaft, each of said rotors including one or more electret poles; and a stator including a plurality of electrodes for driving said rotors in response to an applied AC signal.

* * * * *